United States Patent
Correa et al.

(10) Patent No.: US 6,629,962 B2
(45) Date of Patent: Oct. 7, 2003

(54) NEEDLE DESIGN FOR LIVE MICROORGANISMS

(75) Inventors: Rafael S. Correa, Salisbury, MD (US); William D. Samson, Salisbury, MD (US); Marco A. Quiroz, Salisbury, MD (US)

(73) Assignee: Machining Technologies, Inc., Hebron, MD (US)

( * ) Notice: Subject to any disclaimer, the term of this patent is extended or adjusted under 35 U.S.C. 154(b) by 0 days.

(21) Appl. No.: 09/835,482

(22) Filed: Apr. 17, 2001

(65) Prior Publication Data

US 2002/0151843 A1 Oct. 17, 2002

(51) Int. Cl.[7] .................................................. A61M 5/32
(52) U.S. Cl. .................... 604/272; 604/506; D24/114
(58) Field of Search ............................ 604/28, 38, 48, 604/500, 506, 181, 187, 188, 264, 272; 24/112–114

(56) References Cited

U.S. PATENT DOCUMENTS

| 135,612 | A | * | 2/1873 | Wingate | 604/181 |
| 4,559,039 | A | * | 12/1985 | Ash et al. | 604/175 |
| 4,681,063 | A | | 7/1987 | Hebrank | 119/1 |
| 5,964,737 | A | * | 10/1999 | Caizza | 604/187 |
| 6,123,688 | A | | 9/2000 | Botich et al. | 604/220 |
| 6,217,550 | B1 | * | 4/2001 | Capes | 604/110 |

OTHER PUBLICATIONS

Cloud et al.; Evaluation of MDV Vaccination Programs; Department of Animal and Food Sciences.

Gilbert; Poultry Vaccination Techniques & Evaluation; 1995.

* cited by examiner

Primary Examiner—Paul J. Hirsch
Assistant Examiner—Patrick Buechner
(74) Attorney, Agent, or Firm—Jacobson Holman PLLC

(57) ABSTRACT

The present invention seeks to provide an improved needle design and needle assembly which is particularly adapted for live vaccines and the like. More specifically, the needle assembly includes a gap filler with an inner funnel which is specifically shaped and adapted to fill a turbulence gap naturally formed between a conventional needle retainer and syringe. By maintaining a laminar flow of the fluid, the turbulence and the destruction of live cells are reduced. Additionally, some of the needle designs include a funnel-shaped mouth which is utilized during the filling of the syringe to minimize physical damage to the cell wall or membrane of the live cells otherwise caused by the sharp edges at the tip of a standard injection needle. A breakaway needle assembly is also disclosed.

24 Claims, 3 Drawing Sheets

Figure 1:
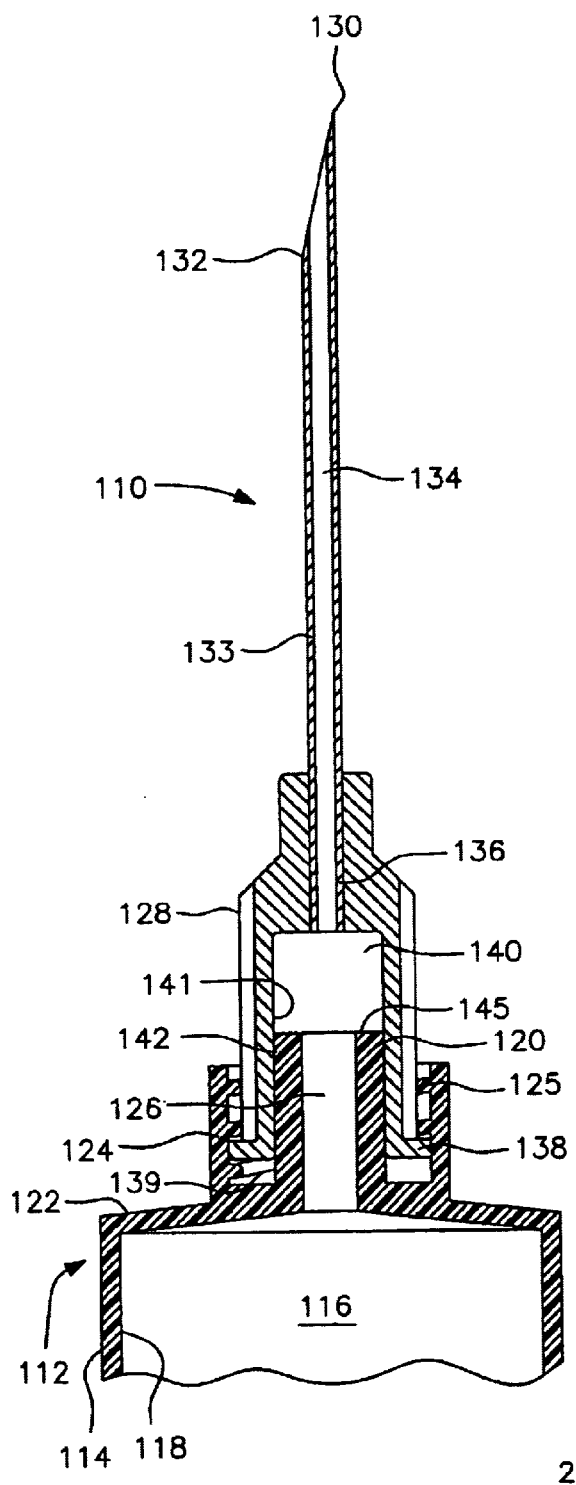

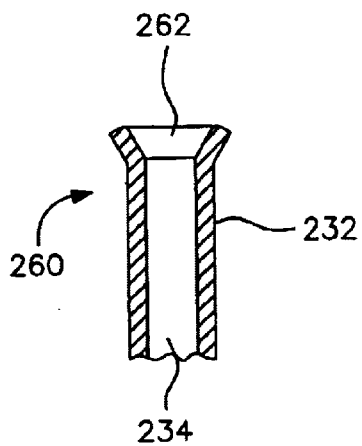
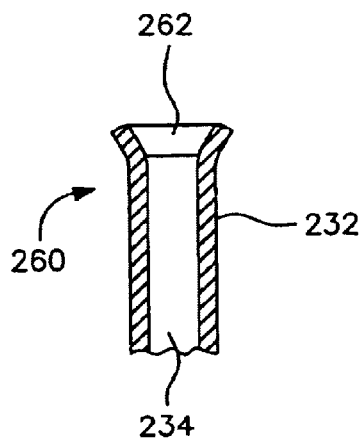
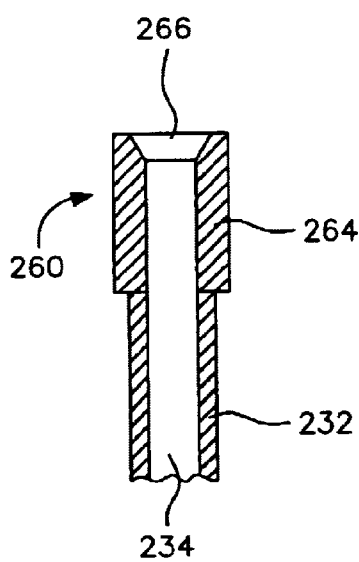
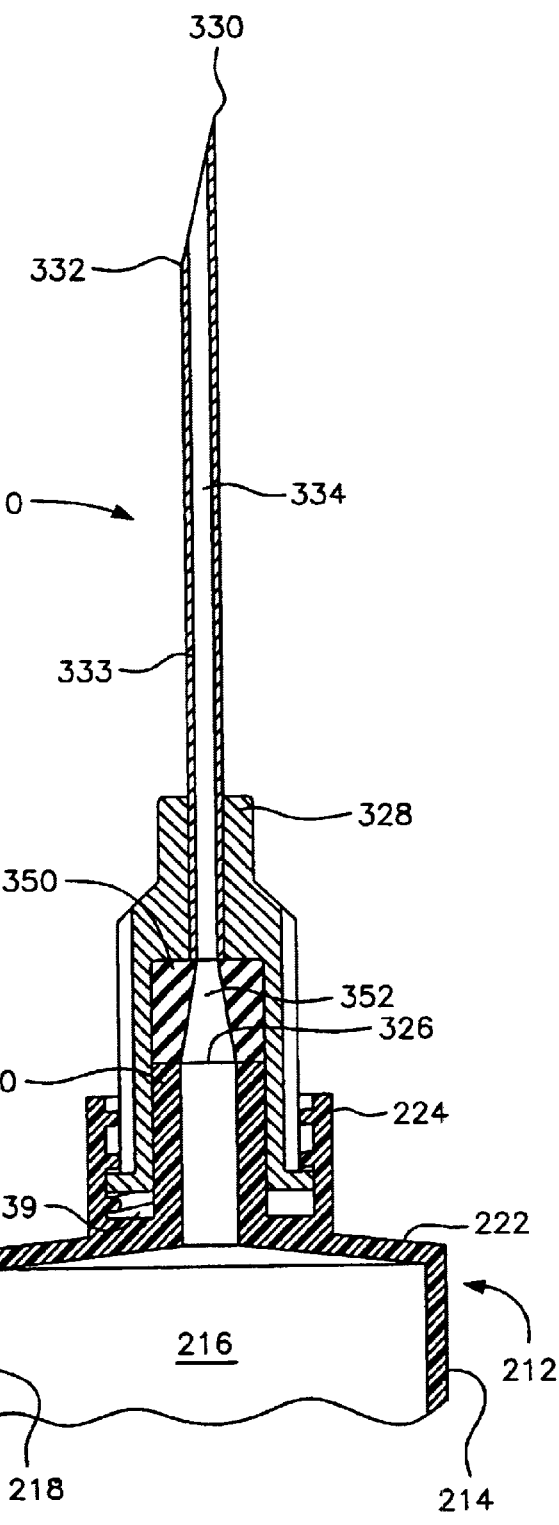

NEEDLE DESIGN FOR LIVE MICROORGANISMS

BACKGROUND OF THE INVENTION

1. Field of the Invention

The present invention relates to improved needle designs for live vaccines and, in particular, live vaccines for Marek's and other diseases affecting chicken and other avian species, as well as for live microorganisms in general. More specifically, the present invention relates to a pair of needle assemblies having a needle and needle retainer which minimizes turbulence and damage to the live cells during transfer of vaccine fluids into and out of a standard syringe.

2. Prior Art

Marek's disease is a viral disease of chickens resulting in a type of cancer, and is one of the most serious threats to poultry health. This virus lies latent in T-cells, which are a type of white blood cells. T-cells are an integral part of the immune system response which is the bird's natural defense against disease. Within three weeks of infection, the fatal virus manifests as aggressive tumors in the spleen, liver, kidney, gonads, skin and muscle of the infected bird.

Marek's disease is a herpesvirus-induced lymphoproliferative disease that occurs naturally in chickens. Since the advent of the turkey herpesvirus vaccine (HVT), newly hatched chicks have been routinely inoculated against the disease prior to being placed in the brooder houses. Although HVT vaccine is generally quite effective, occasionally inoculated flocks experience heavy Marek's disease losses. More recently, it has been found that by proper selection of both the site and time of inoculation, embryonic vaccination can be effective in the control of poultry diseases. It is essential that the egg be injected during the final quarter of the incubation period, and that the inoculate be injected within either of the regions defined by the amnion or the yolk sac. Under these conditions, the embryo will favorably respond immunologically to the vaccine with no significant impairment of its prenatal development.

A live cell-associated virus vaccine of tissue culture origin typically contains the Rispens strain, the SB1 strain of the chicken herpes-virus and the FC 126 HVT strain of the turkey herpes virus alone or in combination. The vaccine is presented in glass ampules containing concentrated vaccine, typically 1000 doses each, with a specified titer defined as Plaque Forming Units ("PFUs"). The vaccine product is stored in a frozen condition typically in liquid nitrogen freezer and shipped in liquid nitrogen. A special sterile diluent is supplied in a separate package, typically a sealed plastic bag with appropriate injection port and delivery tube opening. The vaccine is reconstituted by thawing the frozen vaccine in the glass ampule. The ampule is then broken open and the liquid vaccine product is withdrawn from the ampule using a standard needle and syringe. The diluent is stored at room temperature until use when the concentrated vaccine product withdrawn from the ampule by the needle and syringe is then injected into the diluent contained in the sealed plastic bag through the bag injection port. The reconstituted vaccine is then ready for delivery from the sealed bag through the delivery tube.

There are various factors that affect the level of PFUs delivered by a live cell associated vaccine, such as Marek's vaccine, to an inoculated specimen. Most of these factors occur during the vaccine reconstitution and in the delivery process and both have to do with vaccine handling, temperature, turbulence in the syringe, air pressure, friction, pH, vaccine delivery tube, length and diameter, needle length and diameter, needle shape and delay in vaccine consumption after thawing. Elimination or reduction of the adverse effects arising from any one of these noted factors would greatly improve the inoculation process for Marek's vaccine, specifically, and for live vaccines, generally.

A conventional needle configuration for drawing a vaccine fluid into a syringe and subsequently delivering the vaccine from the syringe to a vaccine delivery system, such as an automated injection system for avian embryos as disclosed in U.S. Pat. No. 4,681,063, is illustrated in FIG. 1. As shown, a conventional syringe needle, generally designated by reference numeral 110, is attached to a conventional syringe, generally designated by reference numeral 112. The syringe 112 has a hollow tubular barrel 114 having a chamber 116 for retaining fluid, such as the live vaccine. The syringe 112 also has a plunger with a flexible plug (not shown). As is common in the art, the plug will sealingly engage against an inner surface 118 of the syringe barrel 114, with the plunger being pulled out of the chamber 116 to draw fluid into the chamber and being pushed into the chamber 116 to inject fluid out of the chamber.

The syringe 112 has a standard tubular extension 120 projecting from end 122 of the barrel 114. The tubular extension 120 has a cylindrical axial passageway 126 which communicates with the syringe chamber 116 and needle assembly 110, when attached. The tubular extension 120 is surrounded by a collar 124 which has internal male threads 125 so that the needle assembly 110 can be sealingly attached in a conventional manner by outwardly extending flange 138 screwing downwardly on threads 125.

The needle assembly 110 includes an injection needle or cannula 133 and a needle retainer 128. The retainer 128 is mounted on the forward end of the syringe 112 as previously described to retain the needle assembly 110 in generally axial alignment with the syringe 112 and tubular extension 120. The needle 133 is made of conventional needle materials, such as stainless steel for strength and chemical compatibility, and the retainer 128 is preferably made of a suitable plastic material which can be easily molded around the end 136 of needle 133.

The needle 133 includes a hollow central passageway or lumen 134 and a sharpened tip 130 at its outer end 132 formed by an angled cut of the hollow needle. The needle 133 is preferably surrounded by a cap or sheath (not shown) before the needle is used for sterility, and the sheath is easily removed in a conventional manner when the needle and syringe are ready for use.

To hold the needle assembly 110 in generally axial alignment with the syringe, the retainer 128 has an axial bore 141 and an outwardly projecting rim or flange 138 at the syringe receiving end. The axial bore 141 is sized to fit in sealing engagement over the tubular extension 120, while the outer circumference of the rim or flange 138 engages the threads 125 on the inner wall of surrounding collar 124. As assembled, the outwardly projecting rim or flange 138 snugly fits down into space 139 between the outer surface 142 of the tubular extension 120 and the inner surface of the collar 124. Thus, mounted on the syringe 112, the hollow central passageway or lumen 134 of the needle portion 133 aligns with the passageway 126 of the tubular extension 120 and the chamber 116 of the syringe 112.

The conventional syringe and needle assembly as previously described and shown in FIG. 1 is commonly used and well known. The assembly is particularly intended for single dosage use, and for storage, transportation, and injection while filled with fluid. It is also the standard assembly for transferring concentrated live virus vaccines, such as Marek's vaccine, from supply ampules to diluent storage containers or bags where it is appropriately diluted for delivery to a specimen to be vaccinated, such as chicken egg embryos and the like, by known vaccine delivery machines or systems. It has been surprisingly discovered that the use of this conventional syringe and needle assembly for transferring live vaccines creates unexpected problems in the destruction of the live cells caused by turbulence of the vaccine during both the drawing of the vaccine into the syringe chamber 116 and the discharge of the vaccine from the chamber 116, through the passageway 126 of extension 120 and the passageway 134 of the needle 133.

While it was known that turbulence could be detrimental to the live cell count of various vaccines, including Marek's vaccine, it was not appreciated that the conventional syringe and needle assembly as commonly used for transfer of these vaccines would cause significant turbulence and that this turbulence could significantly reduce the live cell count, or the PFUs of the vaccine, including Marek's vaccine, both during the filling of the syringe barrel 114 and during injection of the vaccine out of the syringe.

The problem with this commonly used needle and syringe assembly is that a tubular gap, indicated by numeral 140 in FIG. 1, is formed between the top of the tubular extension 120 and the rear part 136 of the needle 110. It has been found that this tubular gap 140 causes turbulence in the fluid flowing between needle 133 and tubular extension 120, both during the filling of the syringe barrel 114 and during the injection of the vaccine from the syringe.

To understand the effect of turbulence in the context of the present invention, it is believed that a brief discussion of flowing fluid would be helpful. When fluid flows slowly and smoothly, the flow is called laminar. At fast velocities, however, the inertia of the fluid overcomes fluid frictional forces and turbulent flow results. When a fluid is flowing this way, it flows in eddies and whorls (vortices), and there is much more drag than when the flow is laminar.

Turbulence is composed of eddies: patches of zigzagging, often swirling fluid, moving randomly around and about the overall direction of motion. Technically, the chaotic state of fluid motion arises when the speed of the fluid exceeds a specific threshold, below which viscous forces damp out the chaotic behavior. As applied to live vaccines, such as Marek's vaccine, turbulence that disrupts the flow causes the live cells to bounce off one and another. This bouncing during the turbulence kills live cells, thus reducing the PFUs which can be delivered by the vaccine.

Upon studying the conventional syringe and needle assembly, it has also been determined that damage to the live cells of the concentrated vaccine also occurs at the outer end 132 of the needle 133 due to the sharpened tip 130 during the drawing of the vaccine into the syringe barrel 114. The live cells of known vaccines for inoculating chicken and other avian species embryos, including Marek's vaccine, as well as the live cells in many other live cell fluids are very fragile. Damage to the outer membrane or cell wall can cause rapid destruction of the live cell. It has been found that the sharp edges of the needle tip tend to physically damage the cell wall or membrane of the live cells when drawn into the needle. This damage can be very detrimental to the live cells in known vaccines, particularly Marek's vaccine, and substantially reduce the PFUs which can be delivered.

SUMMARY OF THE INVENTION

In view of the turbulence generated by conventional needle designs and the sharp needle tip, as well as other problems and disadvantages of the prior art, the present invention seeks to provide improved needle designs and needle assemblies which are particularly adapted for transferring concentrated live vaccines and other fluids containing live cells. More specifically, the needle assemblies of the present invention are specifically shaped and adapted to fill the tubular gap between the needle retainer and the syringe to reduce the turbulence and destruction of the live cells of the vaccine, thus delivering higher PFU values. Additionally, the present invention includes a needle design which is utilized during the filling of the syringe to minimize the physical damage to the live cells of vaccines and other fluids caused by the sharp edges at the tip of the needle.

In order to minimize the turbulence and promote a laminar flow of the concentrated vaccine, and to minimize physical damage to the live cells, the needle assemblies of the present invention modify the standard needle structure in two important ways.

First, the needle retainer 128 is modified to include an insert or filler to fill the gap 140 while at the same time providing an axial passageway to connect passageway 126 of the syringe tubular extension 120 with the entrance to the passageway or lumen 134 of the needle 133. The axial passageway of the gap insert or filler is designed to provide a smooth flow transition between the larger diameter extension passageway 126 and the smaller diameter needle passageway 134. The insert or filler is sized so that the end facing the outer surface 145 of the extension 120 sealingly abuts the surface 145 when the needle retainer 128 is screw threaded into collar 124 and the axial bore 141 reaches tight sealing engagement around syringe extension 120. In order that the fluid can have a continuous laminar flow, the gap insert or filler has an inner throughbore which is preferably funnel or conically shaped. The top opening of the throughbore is substantially equal in diameter to the rear opening of the needle lumen, and the rear opening of the throughbore is substantially equal in diameter to the opening of the syringe extension passageway. Thus, the live cells are not bouncing around in the gap 140 and turbulence is minimized.

Second, a different needle tip is used for drawing the concentrated vaccine from the ampule, in particular, a needle tip having a funnel shape to form an open mouth at the entrance end of the needle or cannula 133. With this funnel shape, the needle end can more gently draw the vaccine into the hollow needle passageway 134 without damage to the cell wall caused by the sharp edges of pointed tip 130. Since damage to the cell wall im minimized, the destruction of the live cells is reduced and each dosage of vaccine has higher PFUs to vaccinate the embryos.

A needle with an open mouth in accordance with the present invention can be used when drawing the concentrated vaccine up from the ampule because the ampule has an opening for withdrawing the vaccine therefrom and does not need to be punctured by a sharp needle tip. On the other hand, when delivering the concentrated vaccine to a delivery system, it is typically desirable to puncture the container containing the vaccine diluent, through the injection port, or the container for holding the diluted vaccine for delivery to the avian embryos. In such circumstances, the needle tip must have a sharpened point such as used in the standard needle configuration. However, when delivering the concentrated vaccine from the syringe through the needle portion, the vaccine does not encounter the sharp edges at the needle tip, in contrast to drawing the concentrated vaccine into the needle. Hence, the standard needle tip does not cause significant disadvantages during the delivery of the concentrated vaccine into the diluent bag or other container.

In one embodiment of the present invention the needle retainer is modified with the requisite insert or filler to provide a smooth laminar flow between the needle and the syringe. The needle also has a funnel shape to form an open mouth at its tip. The needle is further modified, however, to have a breakaway tip so that after the concentrated vaccine has been drawn into the syringe through the open mouth, the outer extremity of the needle can be broken away to leave a sharp point needle tip for subsequently injecting the concentrated vaccine into the diluent bag or other container. The breakaway tip is formed by a diagonally-positioned weakened area in the needle near the tip. The weakened area can be molded into the needle, if the needle is made from plastic, or scored or ground into the needle outer surface if the needle is made from metal.

It is therefore an object of the present invention to provide a needle assembly which can be assembled on a conventional syringe and which minimizes the turbulence imparted to a concentrated vaccine, especially a vaccine containing live cells, so as to avoid destruction of the live cells during transfer of the vaccine using the needle and syringe assembly.

Another object of the present invention is to provide a needle assembly in accordance with the preceding object and which includes a needle retainer having a tubular insert or filler with an inner funnel or conical shaped throughbore such that the opening adjacent the rear of the needle has a diameter substantially equal to the needle diameter and the opening adjacent the syringe extension has a diameter substantially equal to the diameter of the extension passageway.

A further object of the present invention is to provide a needle assembly for attachment to a conventional syringe which has a needle tip that serves to reduce the physical damage imparted to the live cells contained in a concentrated vaccine or other fluid during the drawing of the vaccine into the syringe.

A still further object of the present invention is to provide a needle assembly in accordance with the preceding object in which the needle tip has an open mouth with the mouth diameter larger than the diameter of the needle passageway.

Still another object of the present invention is to provide a needle assembly in accordance with the preceding objects which has a needle tip that serves to reduce the physical damage imparted to the live cells contained in a concentrated vaccine or other fluid during the drawing of the vaccine into the syringe and has a breakaway needle configuration which, upon removal of the needle end, leaves a sharpened needle tip of standard configuration.

A final object of the present invention to be set forth herein is to provide needle assemblies which can be installed on a conventional syringe and which will conform to conventional forms of manufacture, be of simple construction and easy to use so as to provide needle assemblies that are economically feasible, highly strong and durable, and relatively trouble-free in use.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a partial cut away side view illustrating a conventional needle assembly installed on the end of a conventional syringe;

FIG. 2 is a partial cut away side view illustrating a needle assembly in accordance with the present invention installed on the end of a conventional syringe for transferring live vaccines and other fluids, and including a modified needle tip to have an open mouth;

FIG. 3 is an enlarged cut away side view of FIG. 2 illustrating one embodiment of the open mouth needle tip of the present invention;

FIG. 4 is another enlarged cut away side view of FIG. 2 illustrating another embodiment of the open mouth needle tip of the present invention;

FIG. 5 is another enlarged cutaway side view illustrating a further embodiment of an open mouth needle tip of the present invention;

FIG. 6 is a partial cutaway side view illustrating a needle assembly of the present invention installed on the end of a conventional syringe, except the needle tip is the standard piercing design; and FIG. 7 is a partial cutaway side view illustrating a further needle assembly in accordance with the present invention installed on the end of a conventional syringe for transferring live vaccines and other fluids, and including a breakaway needle tip.

DESCRIPTION OF THE PREFERRED EMBODIMENTS

Although preferred embodiments of the present invention are explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Referring now to FIG. 2, there is shown a needle assembly, generally designated by reference numeral 210, assembled in a conventional manner on the end of a conventional syringe, generally designated by reference numeral 212. The syringe 212 has a hollow tubular barrel 214 with a chamber 216 for receiving and retaining fluid. The needle assembly 210 is used in accordance with the present invention to draw fluid, especially live vaccines such as Marek's vaccine, into syringe barrel 214. The syringe 212 also has a plunger with a flexible plug (not shown). As is common in the art, the plug will sealingly engage against inner surface 218 of the syringe barrel 214, with the plunger being pulled out of the chamber 216 to draw fluid into the chamber 216 through the needle assembly 210.

The syringe 212 has a standard tubular extension 220 projecting from end 222 of the barrel 214. The tubular extension 220 has a cylindrical axial passageway 226 which communicates with the syringe chamber 216 and needle assembly 210, when attached. The tubular extension 220 is surrounded by a collar 224 which has internal male threads 225 so that the needle assembly 210 can be sealing attached in the conventional manner by outwardly extending flange 238 screwing downwardly on threads 225.

The needle assembly 210 includes a needle or cannula 233 and a needle retainer 228 at the attaching end for assembly on the forward portion of the syringe 212 in the conventional manner so that the needle 233 projects from the syringe 212. The needle 233 is made of conventional needle materials, such as metal or plastic, and the needle retainer 228 is also made from conventional needle retainer materials, such as aluminum or plastic which can be readily molded onto the end of the needle 233.

The needle 233 includes a unique tip generally designated by reference numeral 260, at its forward end 232, described below, and has a hollow center passageway or lumen 234. When packaged, the needle 233 is preferably encased in a cap or sheath (not shown) for sterility, that is removably attached in a conventional manner to the exterior of the retainer assembly 228. The needle retainer 228 includes a conventional outwardly projecting rim or flange 238 which is screw threaded downwardly inside the internal male threads 255 on the inside wall of collar 224 which surrounds the tubular extension 220 of syringe 212. At the same time, the internal wall of the axial bore 241 at the attaching end of the needle retainer 228 engages the external surface of the syringe tubular extension 220 to form a tight seal therewith. When mounted on the syringe 212, the center passageway 234 of the needle 233 aligns with the passageway 226 of extension 220 and the chamber 216 of the syringe.

Figure 2:
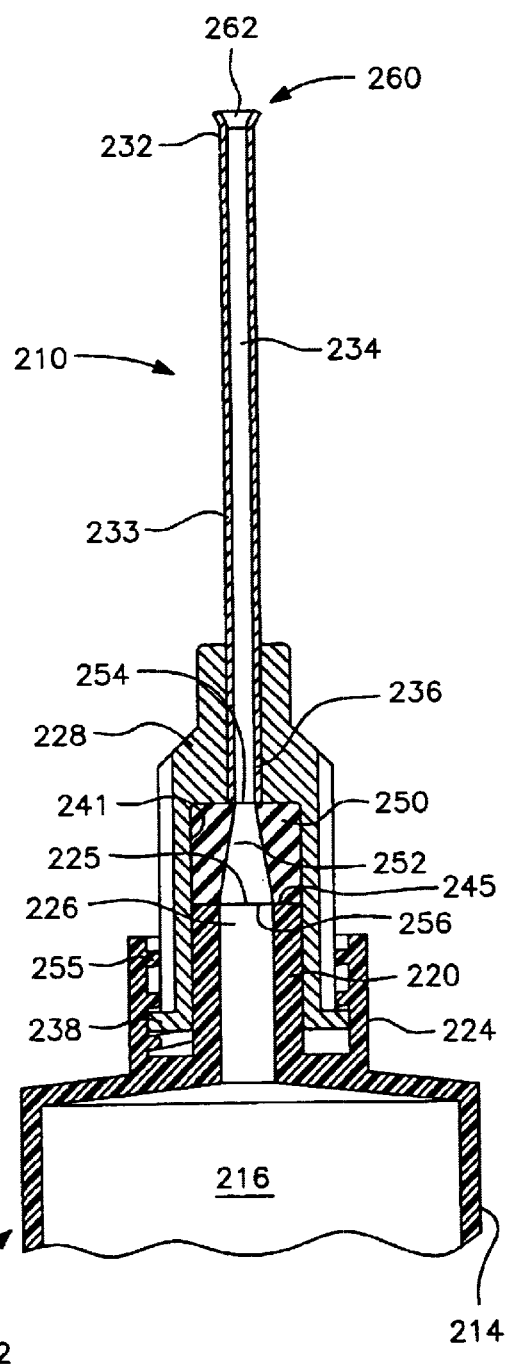

Reference is now directed to the needle tip 260 shown in FIG. 2 and, in more detail, in FIGS. 3 and 4. It has been found that when a conventional sharp tip needle is used to draw in live vaccines from their supply ampules, such as Marek's vaccine, into the chamber 216 of the syringe 212, the sharp edges of the needle tip damage the wall or membrane of the cells, and a number of live cells are destroyed, thus reducing the PFUs level. To minimize this destruction of the live cells at the tip, an open mouth or funnel-shaped tip, generally designated by reference numeral 260, has been developed.

The funnel-shaped tip 260 is made of the same material as the remainder of the needle 233 and can be formed thereon in any conventional manner, such as by conventional mechanical and/or hydraulic equipment. The funnel-shaped tip 260 forms an open mouth 262. In the embodiment shown in FIG. 3, the tip is angularly shaped to form the funnel-shaped mouth 262. In the embodiment shown in FIG. 4, the funnel tip has a gradual curved shape to form the funnel-shaped mouth 262.

Turning next to the embodiment shown in FIG. 5, this embodiment differs somewhat from the needle tips shown in FIGS. 3 and 4. In the FIG. 5 embodiment, an enlarged tip 264 is attached at the end of needle 232. The tip 264 is preferably made of the same material as the needle 233 and is molded onto the end of the needle 232, if plastic, or welded on, if metal. The funnel shaped mouth 266 can then be formed in the open end of the enlarged tip 264 by a suitable machining or the like. With these funnel shapes in FIGS. 3, 4 and 5, the needle can draw the live vaccine or other fluid and funnel it down into the needle passageway 234 with far less damage caused to the live cells at the needle tip. Hence, the destruction of live cells, and the reduction of PFUs in live vaccines such as Marek's vaccine, are substantially reduced.

When drawing liquid into the syringe 212, the plunger and flexible plug (not shown) move away from the end 222 of the barrel 214 thus pulling the liquid into the needle 210 and through the center passageway 234. At this point, the fluid has a laminar flow. As the fluid reaches the rear part 236 of the needle 223, it enters axial throughbore 252 of a tubular gap filler or insert 250. The tubular gap filler or insert 250 fills the tubular gap 140 which otherwise would be present in conventional assemblies as described in accordance with FIG. 1. The throughbore 252 preferably provides an axial funnel or conical shaped passage.

This funnel-shaped passage has an upper opening 254 which has substantially the same diameter as the hollow center passageway 234 of the needle 210, and they are axially aligned. The throughbore 252 has a lower opening 256 which is much larger than the upper opening 254 and has substantially the same diameter as the syringe extension passageway 226 to which it is axially aligned, as well. Thus, as the fluid flows from the needle 210, through the throughbore 252 of tubular gap filler 250 and into passageway 226, the fluid remains substantially laminar as it continues to move into the chamber 216 of the syringe 212. Since the tubular gap filler 250 maintains the fluid in a laminar flow, very few live cells are destroyed by turbulence if the fluid were a live vaccine, such as Marek's vaccine.

The tubular gap filler or insert 250 is sized in the longitudinal direction so that the lower end sealingly engages the outer surface 245 of the syringe tubular extension 220 when the needle assembly 210 is properly assembled on the end of the syringe 212 as previously described. While the tubular gap filler or insert 250 is shown in FIG. 2 as a separate element inside the bore 241 of the needle retainer 228, it is preferred that the gap filler 250 be molded as a unitary component together with the needle retainer 228 when the retainer 228 is molded onto the end 236 of the needle 233 while at the same time forming the funnel-shaped throughbore 252 therein. If the gap filler 250 is a separate insert element from tubular retainer 228, the insert 250 can be made of any suitable material, such as plastics or the like. It is sized to fit snugly at the bottom of the axial bore 241 of the needle retainer 228 with the funnel-shaped throughbore 252 properly aligned with the needle passageway 234 and the tubular extension passageway 226.

Turning now to FIG. 6, there is shown another needle assembly embodiment of this invention, generally designated by reference numeral 310, which is installed on the conventional syringe 212 shown in FIG. 2. Needle assembly 310 can be used to inject vaccine or other fluids from chamber 216 of syringe 212. In this embodiment of the invention, the syringe 212 is also identical to the conventional syringe 112 described previously. The needle assembly 310 in this embodiment includes an injection needle or cannula 333 and a needle retainer 328. The needle retainer 328 is identical to needle retainer 228, previously described in connection with needle assembly 210 of FIG. 2, and includes an identical tubular gap filler or insert 350.

However, in this embodiment of the invention, the needle 233 is an injection needle and includes a piercing tip 330 substantially identical to the standard tip 130 previously described for needle 133, as shown in FIG. 1. The piercing tip 330 may be necessary in order to inject the live vaccine or other fluid contained in chamber 216 into the desired compartment for delivering the vaccine to the bird or avian embryo.

When the live vaccine is being injected from the syringe 212, the tubular gap filler 350 and throughbore 352 also eliminate turbulence in this area. The fluid is pushed out of chamber 216 by a plunger (not shown) and into the passageway 326. The fluid then flows into the funnel-shaped throughbore 352. The flow of the fluid is slow and smooth. As the fluid travels through the throughbore 352, it continues into the center passageway 334 of the needle 310. The fluid then flows out of the tip 332.

It has been found that there is considerably less damage to the live cells when injecting a live vaccine or other fluid out of a standard slanted needle tip, such as tip 332 shown in FIG. 5 and tip 132 shown in FIG. 1, then when attempting to draw live vaccine or other fluids into the central needle passageway through such a tip. Hence, the damage imparted to a live vaccine which is injected out of syringe 212 through tip 332 is minimal and there is very little live cell destruction or reduction of the PFUs. The standard needle tip construction as embodied in tip 332 is preferred for injecting the live vaccines, such as Marek's vaccine, in as much as the sharp piercing point 330 may be necessary for transferring the vaccine from the syringe chamber 316.

In transferring live vaccines, such as Marek's vaccine, in accordance with the present invention from their original ampules to a container for delivering the vaccine to the birds or other avian embryo, a sterile needle assembly 228 is assembled onto a sterile syringe 212 to form the needle and syringe assembly illustrated in FIG. 2. The needle tip 232 is then inserted into the ampule containing the live vaccine, and the vaccine is slowly drawn into and through the needle 233 in central passageway 234 and then into the syringe chamber 216. The presence of the unique open mouthed or funnel-shaped tip 232 on the end of needle 233 and the filler or insert 250 serve to promote laminar flow and reduce turbulence during the syringe filling operation. Once the vaccine in the ampule has been exhausted or the syringe chamber 216 has been filled, the needle assembly 210 is removed from the syringe 212 by turning the tubular retainer 228 to disengage outwardly extending flange 238 from the internal male threads 225 on collar 224. A new and sterile needle assembly 310 is then screw threadedly engaged onto the syringe 212, now containing the vaccine in the chamber 216, to form the assembly shown in FIG. 6. Of course, if a piercing tip 330 is not necessary to transfer the vaccine or other fluid from syringe chamber 216 to the desired container, it could be possible to use the original needle assembly 210, without substituting the alternate needle assembly 310.

It is contemplated as part of the present invention that the needle assemblies 210 and 310 will be provided to the poultry operators or vaccine users in pairs as a set. Then, the operator or user will have one needle assembly corresponding to assembly 210 to draw the vaccine from the ampule into the syringe and a second needle assembly corresponding to assembly 310 to dispense the vaccine out of the syringe.

Figure 7:
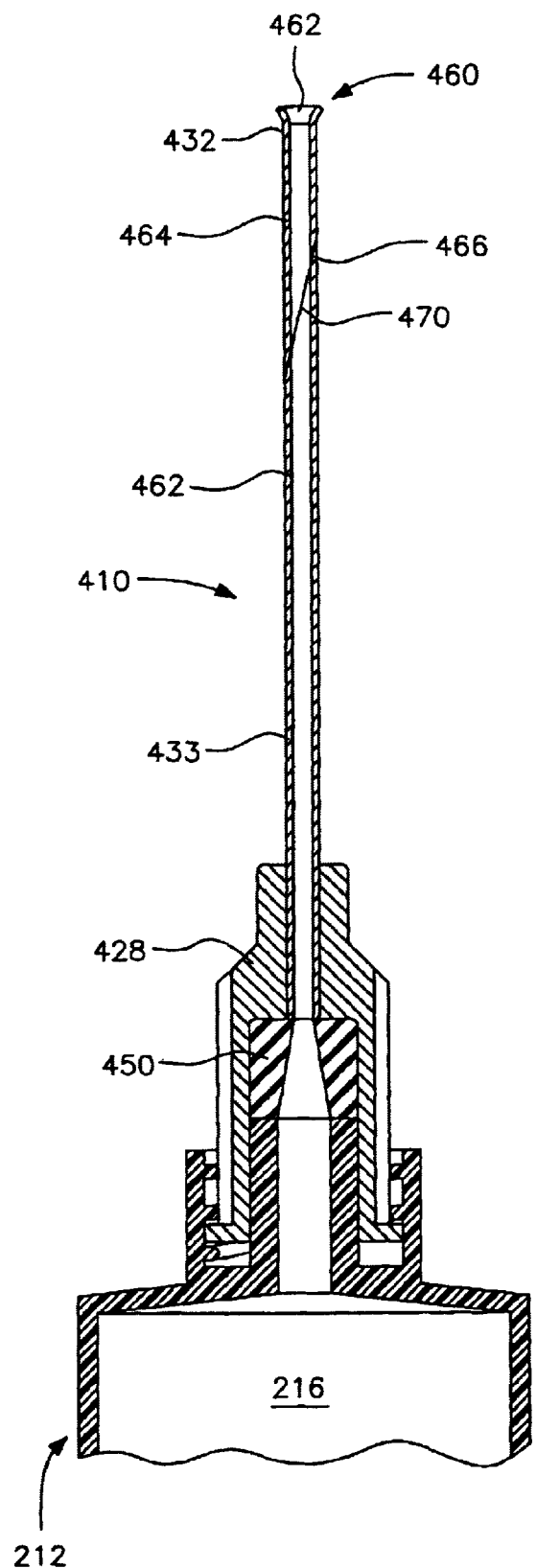

Turning now to FIG. 7, there is shown another needle assembly embodiment of this invention, generally designated by reference numeral 410, which includes a breakaway needle. The needle assembly 410 can be used to draw concentrated live vaccines or other fluids into chamber 216 of the syringe 212 as well as inject the vaccine or other fluids from the syringe 212. In this embodiment of the invention, the syringe 212 is also identical to the conventional syringe 112 previously described, and the needle assembly 410 includes a needle 433 and a needle retainer 428. The needle retainer 428 is identical to needle retainers 228 and 338, previously described in connection with needle assemblies 210 and 310 of FIGS. 2 and 6, and includes an identical tubular gap filler or insert 450.

The needle 433 includes a weakened area 470 near the outer tip 432 which divides the needle 433 into a main needle portion 462 and a removable needle end 464. The weakened area 470 is at a sharp diagonal to the longitudinal axis of the needle such that upon removal of the removable needle end 464, the main needle portion 462 is left with a sharp pointed needle tip 466, preferably of standard configuration. The weakened area 470 can be molded into the wall of the needle, if the needle 433 is molded from plastic, or the weakened area 470 can be scored or ground on the outer surface of the needle, or otherwise formed in the needle wall, if the needle 433 is made of metal.

When using the needle assembly 410 in conjunction with syringe 212, live vaccines, such as Marek's vaccine, or other live cell fluids can be drawn into syringe chamber 216 through the open mouth 462 of the funnel shaped tip 460 without encountering the sharp edges normally associated with a standard needle tip. Once the vaccine or other fluid has been drawn into the syringe chamber 216 with the smooth transition flow provided by insert or filler 450, the needle breakaway end 464 can be detached from main needle portion 462 along weakened area 470. This leave main needle portion 462 with a standard piercing needle tip 466 which can be used to pierce an injection port of a standard diluent bag or other container for injecting the vaccine or other fluid from the syringe chamber 216 out through the needle tip 466.

While the needle assemblies of the present invention have been described specifically for use with live vaccines and other fluids in general, and Marek vaccine in particular, the needle assemblies have broad application. It is contemplated that the needle assemblies of the present invention could be used with Probiotics (Lactobacillus) or any other microorganism in a fluid suspension. Additional uses could be with sperm and blood cells, or any other live cell fluid or live organism that might be injured or destroyed by turbulence or sharp edges of a standard needle assembly.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A needle assembly for live vaccines, said needle assembly comprising:

a hollow needle having a rear opening;

a needle retainer surrounding said rear opening for frictionally fitting said hollow needle to a standard syringe in axial alignment with an outlet passage in said syringe and forming a gap between said syringe outlet passage and said needle rear opening; and a gap filler filling said gap and having a funnel-shaped throughbore with one end substantially aligned with said syringe outlet passage and another end substantially aligned with said needle rear opening to form a continuous substantially smooth passageway between said syringe outlet passage and said needle rear opening to minimize turbulence of a live vaccine flowing through said filler passageway.

2. The needle assembly as recited in claim 1, wherein said hollow needle includes a sharpened tip.

3. The needle assembly as recited in claim 1, wherein said gap filler is tubular.

4. A needle assembly for live vaccine, said needle assembly comprising:

a hollow needle having a central passageway diameter and terminating in a rear end with a rear opening and a distal end defining a generally circular mouth with an opening substantially perpendicular to a longitudinal axis of said needle central passageway and having a mouth opening diameter;

a needle retainer securely receiving said rear end of said hollow needle for frictionally fitting said needle to a syringe; and said mouth opening diameter being larger than said central passageway diameter to reduce turbulence of a live vaccine drawn through said circular mouth opening into said hollow needle by said syringe.

5. The needle assembly as claimed in claim 4, wherein said distal end is funnel-shaped to form said mouth.

6. The needle assembly as claimed in claim 5, wherein said distal end is angularly shaped to form said funnel-shaped mouth.

7. The needle assembly as claimed in claim 5, wherein said distal end is gradually curved to form said funnel-shaped mouth.

8. The needle assembly as claimed in claim 4, wherein said needle retainer includes a gap filler between said needle rear end and said syringe, said gap filler have a funnel-shaped throughbore which forms a continuous uninterrupted passageway between said needle rear end and said syringe to reduce the turbulence of said live vaccine flowing through said needle retainer into said syringe.

9. The needle assembly as claimed in claim 8, wherein said funnel-shaped throughbore has one opening with a diameter substantially equal to said central passageway diameter and another diameter substantially equal to an inlet opening of said syringe.

10. A needle assembly for live vaccine, said needle assembly connecting to a conventional syringe with a hollow tubular barrel for retaining fluid, a tubular extension projecting from the barrel and having a central passageway with a diameter to communicate with said hollow tubular barrel, said tubular extension being surrounded by a securing collar, said needle assembly comprising:

a hollow needle having forward and rear ends with said rear end forming an opening with a rear diameter smaller than said diameter of said extension passageway;

a needle retainer securely receiving said rear end of said needle for mounting said needle to said syringe by frictionally fitting between said tubular extension and said collar with said extension passageway and said hollow needle being generally axially aligned, and forming a tubular gap between said extension passageway and said needle rear end, said tubular gap having a diameter greater than said extension passageway diameter; and a tubular gap filler having a throughbore with a funnel shape with one opening having a diameter substantially equal to said needle rear diameter and another opening having a diameter substantially equal to said extension passageway diameter to form a substantially smooth uninterrupted tapered passageway between said needle rear end opening and said syringe extension passageway.

11. The needle assembly as recited in claim 10, wherein said needle forward end forms a sharpened tip.

12. The needle assembly as claimed in claim 10, wherein said needle forward end is funnel-shaped to form an open mouth.

13. The needle assembly as claimed in claim 12, wherein said needle forward end is angularly shaped to form said funnel-shaped mouth.

14. The needle assembly for live vaccines as claimed in claim 12, wherein said needle forward end is gradually curved to form said funnel-shaped mouth.

15. A needle set for attachment to a tubular extension of a standard syringe to transfer a concentrated live vaccine from an ampule for dilution which comprises a first and second needle assembly each having a hollow needle with a rear end and a distal end and a retainer molded on said rear end of the needle to attach said needle assembly to said syringe tubular extension in substantially axial alignment with an opening of said tubular extension, each said needle assembly having a smooth uninterrupted interior passageway from said hollow needle rear end into said tubular extension opening to promote laminar flow and minimize turbulence in said vaccine when flowing between said hollow needle and said tubular extension.

16. The needle set as recited in claim 15, wherein said distal end of one of said first and second needle assemblies has a generally circular mouth opening substantially perpendicular to a longitudinal axis of said needle.

17. The needle assembly as claimed in claim 15, wherein said retainer includes a gap filler having a funnel-shaped throughbore to form said smooth uninterrupted interior passageway between said hollow needle rear end and said tubular extension opening.

18. A needle assembly for vaccines and other fluids containing live cells which comprises:

a hollow needle having a distal end with a generally circular mouth opening substantially perpendicular to a longitudinal axis of said needle and a rear end with a rear opening, said mouth opening being larger than said rear opening;

a needle retainer securely receiving said rear part of said hollow needle for frictionally fitting said needle to a standard syringe and having a smooth interior passageway to promote laminar flow and minimize turbulence between said hollow needle and said syringe; and said hollow needle having a weakened area to break away said distal end leaving a sharpened tip on said needle.

19. A syringe and needle assembly to transfer a concentrated vaccine or other fluid containing live cells which comprises a syringe having a tubular extension which provides an opening into said syringe, a needle assembly having a hollow needle with a rear opening at one end and a retainer molded on said one end to attach said one end of the needle assembly into fluid communication with the syringe tubular extension opening, said retainer forming a substantially smooth uninterrupted interior passageway between said hollow needle rear opening and said tubular extension opening to promote laminar flow and minimize turbulence when said vaccine or other fluid is flowing between said hollow needle and said syringe.

20. A syringe and needle assembly as claimed in claim 19, wherein said substantially smooth retainer passageway is funnel-shaped.

21. A method for transferring live vaccines between a delivery opening having a larger diameter and a needle having a smaller diameter lumen and a needle retainer on one end of the needle for attaching said needle in generally axial alignment to said delivery opening, said method comprising forming a continuous substantially smooth passageway in said retainer which passageway gradually reduces in diameter between said larger diameter delivery opening and said smaller diameter lumen at said one needle end, said continuous substantially smooth passageway promoting laminar flow and minimizing turbulence when a vaccine is flowing between said delivery opening and said needle lumen.

22. The method as recited in claim 21, wherein said retainer passageway tapers is funnel-shaped.

23. A method for transferring live vaccines between a receptacle holding said vaccine and a needle lumen having a distal end and a rear end, said method comprising forming a circular mouth opening in said needle lumen distal end which is larger in diameter than said needle lumen, causing suction at said needle lumen rear end to draw a vaccine through said circular mouth opening and into said needle lumen with a reduced turbulence at said needle lumen distal end.

24. The method as claimed in claim 23, wherein said needle lumen distal end is funnel-shaped to form said mouth.

* * * * *